United States Patent [19]

Yaniger

[11] Patent Number: 5,053,585
[45] Date of Patent: Oct. 1, 1991

[54] MULTIPURPOSE KEYBOARD USING DIGITIZER PAD FEATURING SPATIAL MINIMIZATION OF A PRESSURE CONTACT AREA AND METHOD OF MAKING SAME

[75] Inventor: Stuart I. Yaniger, Ventura, Calif.

[73] Assignee: Interlink Electronics, Incorporated, Carpinteria, Calif.

[21] Appl. No.: 598,456

[22] Filed: Oct. 12, 1990

[51] Int. Cl.[5] ............................................. G08C 21/00
[52] U.S. Cl. ....................................... 178/18; 341/25
[58] Field of Search .................... 178/18, 19; 340/711; 341/25

[56] References Cited

U.S. PATENT DOCUMENTS 3,591,749 7/1971 Comstock ......................... 341/25 X Primary Examiner—Stafford D. Schreyer
Attorney, Agent, or Firm—Nilsson, Robbins, Dalgarn, Berliner, Carson & Wurst

[57] ABSTRACT

A multipurpose keyboard incorporating an electronic pressure sensing device, a digitizer pad featuring spatial minimization of a pressure contact area capable of locating the leading and trailing edges of the pressure contact area is described. A processor coupled to the electronic pressure sensing device is programmed to sense when various regions on a simple, fully interchangeable template overlay and the underlying electronic pressure sensing device are depressed. The sensed region is associated by the processor with a particular key identification on the template overlay. The variation of the resistance in the digitizer pad enables the processor to detect the actuation of more than one key on the template overlay at the same time, thereby defecting key rollover. A method of fabrication for a multipurpose keyboard is also described.

18 Claims, 3 Drawing Sheets

MULTIPURPOSE KEYBOARD USING DIGITIZER PAD FEATURING SPATIAL MINIMIZATION OF A PRESSURE CONTACT AREA AND METHOD OF MAKING SAME

BACKGROUND OF THE INVENTION

The present invention relates to a multipurpose keyboard using an electronic pressure sensing device and more particularly to a keyboard incorporating a digitizer pad featuring spatial minimization of a pressure contact area capable of locating the leading and trailing edges of a pressure contact area.

Digitizer pads and their functions are well known.

The United States patents to Eventoff et al., U.S. Pat. No. 4,739,299 issued April 19, 1988 and Margolin, U.S. Pat. No. 4,455,450 issued June 19, 1984 describe digitizer pads having opposing conductor pads with solid or interleaved conductor traces enabling the X—Y or XYZ coordinates of the point of force application against the digitizer pad to be identified. Such digitizer pads use a pointed instrument to apply force against the pad generating a severely localized pressure point.

However, when the localized contact point extends over a larger area where adjacent circuit traces are pressed into contacting relationships, ambiguities result due to the multiple points of pressure application. In such an instance, the measurement of the force position is approximately the barycentric average of the force or, $$<x> = \int xF(x)\,dx / \int F(x)\,dx$$

where:
$<x>$ is the measured force position
$F(x)$ is the distribution of force with position and the integrals extend along the entire length of the position sensor.

It is often desirable to measure the position of the leading or trailing edge of an object applying pressure, rather than its barycentric position. Specifically, a barycentric oriented digitizer pad would have disadvantages for use in an electronic keyboard. Measurement of the leading or trailing pressure edge is useful to determine the size of an object and further provides a dynamic means of measurement for an object's position in motion. For example, a person's fingers applied to a keyboard depressing the keyboard keys. A barycentric device could not distinguish between two keys being struck simultaneously, or a single key, midway between the former keys being struck.

An increasingly common method of building electronic keyboards for computers, word processors, telephones and industrial controls is the use of a membrane switch as the active sensing element.

This membrane switch may be covered with a simple printed template overlay or have mechanical key actuators over the membrane mimicking conventional keyboards. The membrane switch has an array of switches usually on a common substrate which are arranged in the desired keyboard pattern. Commonly, the key strokes are verified by a microprocessor which then translates the key strokes detected into a form suitable for a computer input bus.

It is advantageous to incorporate into a keyboard an electronic pressure sensing device such as a digitizer pad, wherein the essential element of this pad is the ability to detect more that one point of deflection on the pad simultaneously, because actuation element positions are not fixed at manufacture, and can be redefined by hardware or software means.

It is further desirous to utilize a digitizer pad that measures the leading or trailing edge of an object depressing the pad rather than its barycentric position.

A digitizer pad supporting a keyboard is described by U.S. Pat. No. 4,739,299 to F. N. Eventoff et al., issued April 19, 1988 entitled "Digitizer Pad". In general, the Eventoff et al. digitizer pad has generally an opposing conductor pad with solid or interleaved conductor traces to enable the X—Y or XYZ coordinates of the point force application against the digitizer pad to be identified.

Incorporating the standard XYZ digitizer pad as the type developed under U.S. Pat. No. 4,739,200, gives rise to two problems. First, key rollover cannot be detected occurs using this standard digitizer pad. Multiple key commands likewise cannot be detected. The Eventoff et al. XYZ digitizer produces a single point output detection corresponding to the center of an applied force distribution.

It is common for typists, especially typing at high speeds, to experience key rollover whenever a new key is struck before the last key is fully released. On a standard typewriter keyboard configuration, rollover between the letter "q" and the letter "t", for example, would be indistinguishable from striking on the "e" key. This first problem of key rollover can be avoided through the use of leading and trailing edge sensing properties of a digitizer pad operable to measure the vertical and/or lateral distance from the contact points to trailing edge.

A second problem associated with a standard XYZ digitizer pad is the inability to accommodate two key commands (e.g. shift-A for an upper case "A"). For example, on a standard keyboard layout, depressing "Shift" and "x" simultaneously would be indistinguishable from depressing the "z" key.

Finally, it is most desirous to construct a multipurpose keyboard which can receive a variety of template overlays thereby producing different functional keyboards without changing the digitizer pads contact area.

SUMMARY OF THE INVENTION

The present invention, a multipurpose keyboard using a digitizer pad solves the problem of key rollover and multiple key commands when the pad is depressed by an object not having a localized pressure contact point.

The invention provides a multipurpose keyboard operable to accommodate a multiplicity of functions. The keyboard includes: an XYZ digitizer pad featuring spatial minimization of a pressure contact area which can locate the first edge and the second edge of a pressure contact area along both X and Y dimensional directions; at least one interchangeable mechanical overlay residing upon the digitizer pad; a processor interconnected to the digitizer pad through at least one address data bus where the processor sequentially orders pressure contacts applied to the digitizer pad through the mechanical overlay from data received by the processor from the address data bus and a signal translation means specific for each mechanical overlay.

A method of providing a multipurpose keyboard is also described.

One of the many advantages of this invention is the ability to arrange a multiplicity of active sensing elements pattern keys and other functions within the active area of the digitizer pad. There is no intrinsic boundaries between locations on the pad boundaries that cannot be redefined by hardware or software as opposed to the mechanical layout of the switch elements found on standard XYZ digitizer pads.

This advantage, incorporating various model keyboards and key arrangements allows a manufacturer to stock only one digitizer pad instead of a separate membrane switch assembly for each model of a keyboard that he fabricates. For example, left and right hand versions of a keyboard can be produced by changing the mechanical overlay and changing the defined key areas, producing two distinct implementations in a more cost effective manner.

A further advantage of the invention is that non-traditional keyboard functions such as the graphics pad or analog control keys can be built into the multipurpose keyboard at no additional manufacturing cost through the appropriate redefinition of active areas and appropriate overlay design.

Finally, the force required to actuate a sensing region on the multipurpose keyboard is not predetermined by the mechanics of the membranes or the mechanical keys. The continuous resistance change versus force characteristics, of a force sensing resistor as used in a digitizer pad featuring spatial minimization can be exploited to have variable key strike thresholds through the use of either hardware or software.

BRIEF DESCRIPTION OF THE DRAWINGS

A complete understanding of the present invention and of the above advantages may be gained from a consideration of the following description of the preferred embodiments taken in conjunction with the accompanying drawings in which.

DETAILED DESCRIPTION OF THE PREFERRED EMBODIMENT

Figure 1A:
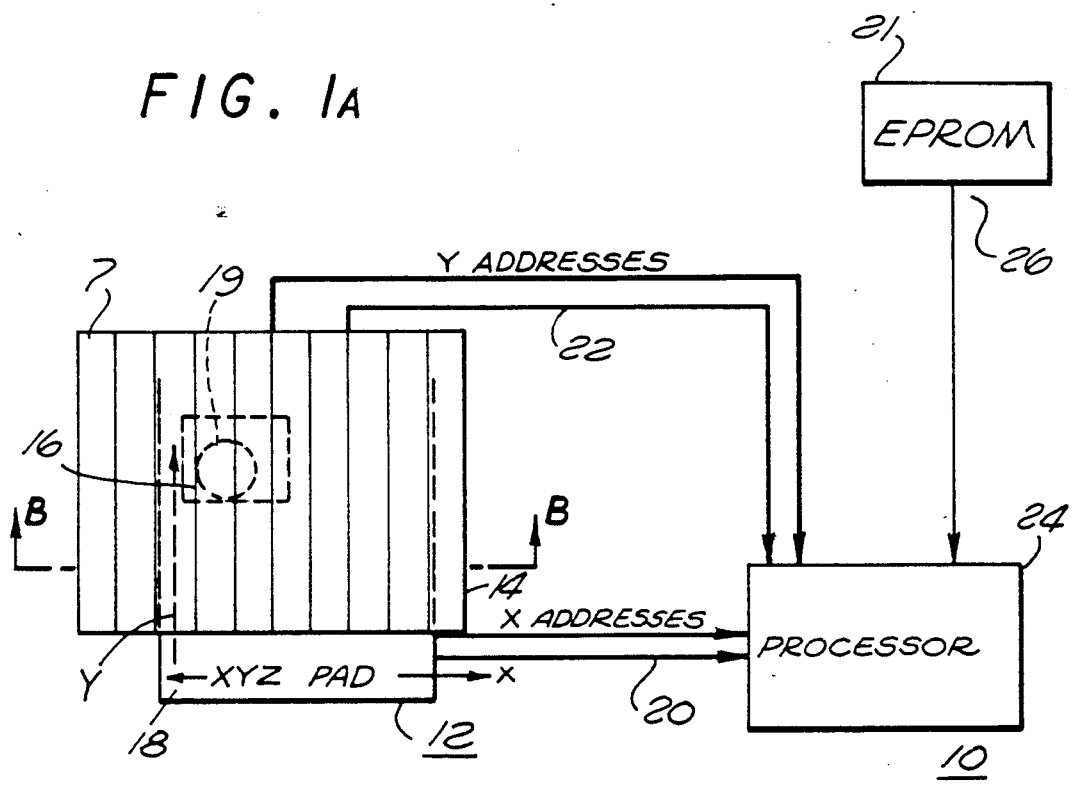
FIG. 1A is a schematic representation of a multipurpose keyboard having cross section IB—IB.

The invention, a multipurpose keyboard incorporates an electronic pressure and position sensory device such as a digitizer pad which receives its use of layered force sensing resistors information on the leading and trailing point pressure applied to a simple template overlay keyboard or mechanical actuator positioned upon it.

A digitizer pad featuring spatial minimization of a pressure contact area detects both the leading and trailing edges surrounding the pressure application area on the pad in the spatial dimensions defined by oriented, interleaved circuit traces identifying the bounds of the area of pressure application in that dimension. This digitizer pad uses one or more digitizer ply structures each structure having interleaved circuit traces of each ply positioned in a predefined or regular orientation relative to the traces of the other plies.

One embodiment of the digitizer pad incorporates two digitizer ply structures oriented orthogonal to one another in a plane. This pad configuration locates the bounds of areas over which the pressure is applied in both the X and Y dimensions. The amount of pressure applied defines a "Z" dimension perpendicular to the plane of the X—Y plane of the two digitizer ply means utilizing a force sensing resistor ply as described the Eventoff U.S. Pat. No. 4,739,299 issued April 19, 1988, and the Eventoff U.S. Pat. No. 4,315,238 issued Feb. 9, 1982.

An example of a digitizer pad fully capable of detecting the leading and trailing edges of a pressure contact area is the patent application to Yaniger et al., U.S. Patent Office Ser. No. 07/308,706, entitled "Digitizer Pad Featuring Spatial Definition of a Pressure Contact Area", filed Feb. 9, 1989.

By coupling a microprocessor to the Yaniger et al. Ser. No. 07/308,706 digitizer pad and programming that microprocessor software to detect when various regions of the digitizer pad have been depressed, a particular key identification can be associated with the sensed region. A single spatial minimization digitizer pad having the same mechanical structure can be used for any number of keyboard configurations as defined by the interconnected processor.

The mapping software for the processor can be incorporated using a memory means or simply programmed through a conventional processor software program.

The multipurpose keyboard using this digitizer pad has one or more digitizer ply structures in a selected stacked orientation, an interchangeable template overlay having a predetermined configuration, an X address information bus operable to transmit information about the X direction location from the spatial minimization digitizer pad to a processor, and a Y address information bus also operable to transmit information on the Y coordinate from the spatial minimization pad to a processor. This processor stores or manipulate the received location information under the direction of a control means operable to perform predetermined control functions on the information and the processor.

An alternative embodiment of the multipurpose keyboard alters the strike force which will activate a particular key by simply varying the software and vary the threshold at which a depression of a key will trigger a response in the processor.

Mapping software within the microprocessor can be incorporated using a memory means or simply programmed through a conventional software program.

FIG. 1A is a schematic representation of a multipurpose keyboard 10 having cross section IB—IB. the keyboard 10 having a spatial minimization digitizer pad 12, is cooperatively associated with and beneath an interchangeable template overlay 14. A pressured key stroke 16 on the template overlay 14 applied to any of the individual keys 7 is detected by the digitizer pad 12. A defined key area 19 on the surface of the spatial minimization digitizer pad 12 below the key stroke area 16 upon the overlay 14 detects the position address in relationship to a coordinate system 18 oriented on the digitizer pad 12. For this example, an X address information bus 20 contains the X addresses for the detected regions and transmits to the microprocessor 24 the X location. This microprocessor 24 similarly receives Y address information from the Y address information bus 22 of address positions detected pressure in the Y direction. A conventional software program 21 stored in signal translation or control means 26 is the mapping software for the processor 24 which manipulates the X and Y addresses as received from the digitizer pad 12 through the X and Y address information buses 20 and 22, respectively.

Control means 26 is changed out of the multipurpose keyboard 10 with each different template overlay or mechanical actuator arrangement 14 used in conjunction with digitizer pad 12. Replacement of the control means 26 thereby provides a directed interpretation of each pressure contact upon the template overlay.

For example, as shown in FIG. 1A, for a first overlay 14 defining a special area 16 as the letter "E", the signal translation means 26, here EPROM, would so interpret the received X and Y address information through the buses 20, 22 as that letter. Changing the first template overlay 14 to a second template overlay 14 would result in another letter or command designation for the same spatial area 16 depressed. This change of the signal translation means 26 in the EPROM by the software 21 provides the correct interpretation of the same depressed spatial area 16 with a different overlay 14. In the second instance of overlay 14 depression, the letter is now detected as "A".

Figure 1B:
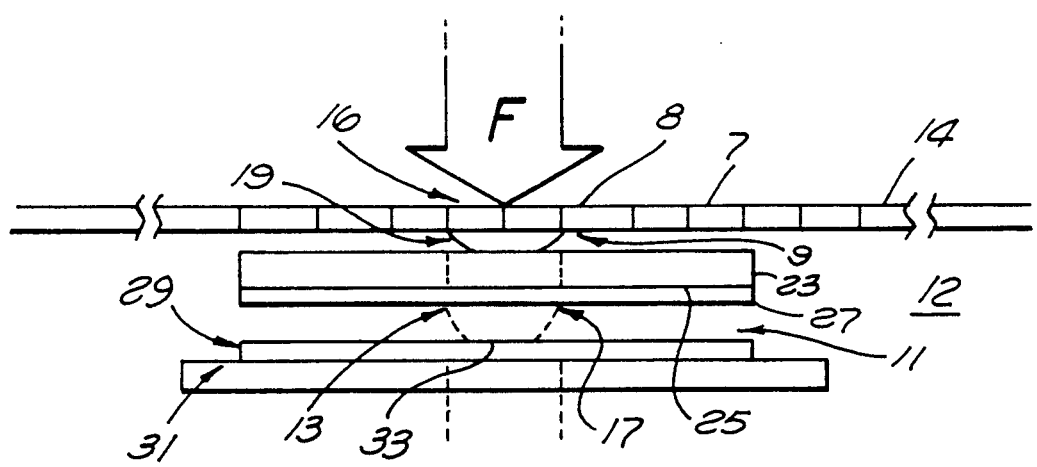
FIG. 1B is a schematic representation cross sectional view of the multipurpose keyboard including digital spatial minimization pad and interchangeable template overlay.

FIG. 1B is a schematic representation cross sectional view taken along line IB—IB of the multipurpose keyboard including the spatial minimization digital pad with interchangeable template overlay. A shunt ply 11 is positioned in overlaying normally non-conducting, relationship to the conductor traces in the sensor pad region 29. The shunt ply 11 may be constructed using an insulative backing 23 such as mylar or any other flexible plastic. The backing 23 has a surface 25 which is deposed in facing relationship to the interleaved first and second conductor traces adjacent the sensor pad region 29 when force F is applied to a selected area of an interchangeable template overlay 14 and consequently to the selected area of the shunt ply 11. The interchangeable template overlay 14 has a multiplicity of individual keys 7, top surface 8 and bottom surface 9. When a key 7 is depressed by force F, the template overlay 14 engages the top surface of the insulated back 23 forming a first pressure region 19 and a second contact area 33. Second contact area 33 has a first pressure edge 13 and a second pressure edge 17 opposite the first pressure edge 13 along the dimension "X" defined by the interleaved orientation of the conductor traces more clearly shown in FIG. 2.

Figure 2:
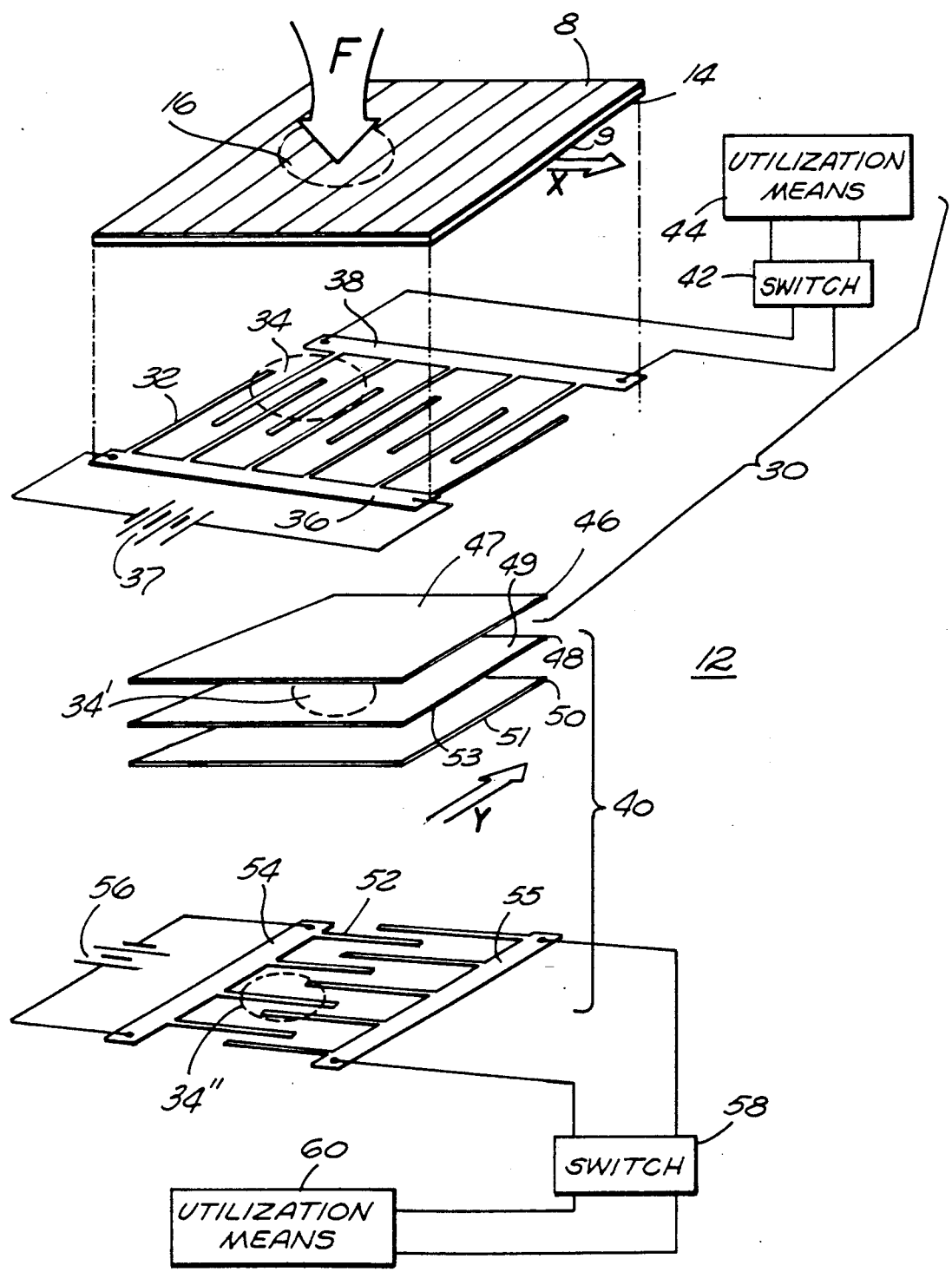
FIG. 2 is schematic representation exploded view of an interchangeable template overlay and digitizer pad.

FIG. 2 is a schematic representation exploded view of an interchangeable template overlay 14 and an electronic pressure sensing device with a digitizer pad 12 featuring spatial minimization. The digitizer pad 12 of this example incorporates an X address detection structure 30 and a Y address detection structure 40. Both the X and Y address detector structures 30 and 40, respectively, incorporate interleaved resistor strips which are spaced apart in relationship having a resistent gradient along the length of the strips. The pressure that is detected by force F as the keystroke 16 on the template overlay 14 keys 7, will be detected by both the X and Y address detector structures 30, 40 through the resistive strips and the multiplicity of plies 50, 48 and 46.

The pressure sensitive composition layer incorporating the X and Y address detector structures gradient strips measure the total force in a direction normal to the plane of the keyboard 10 as defined by the interleaved conductive traces 32 which alternately extend from the first resistor strip 36 and a second resistor strip 38 within the address detector structure 30. A voltage source 37 is coupled across the ends of the first resistor strip 36, a switch 42 and utilization circuit 44 are coupled across the ends of the second resistor strip 38. A first shunt ply 46 comprising a shunt composition layer 47 disposed on one side 49 of an insulator ply 48 is juxtaposed and facing relationship to the sensor pad region 34 defined by the region in which the interleaved conductive traces 32 extend between the first and second resistor strips 36 and 38.

In FIG. 2, a second digitizer ply 40 functioning as the Y address detection structure similarly has a plurality of interleaved conductive traces 52 which extend from a first resistor strip 54 and a second resistive strip 55. Sensor pad region 34' is in line and coextensive with the first sensor pad region 34 and is shown upon insulator ply 48. A voltage from a second voltage source 56 is applied across the ends of the first resistor strip 54 with a switch 58 and a utilization circuit 60 coupled across the ends of the second resistor strip 55. A second shunt ply 53 comprising a second shunt composition layer 57 is disposed on the other side 53 of the insulator ply 48 which is juxtaposed in a facing relationship to the sensor pad region 52 defined by the region in which the interleaved conductive traces 52 extend between the first and second resistor strips 54 and 55.

In the illustrated embodiment of FIG. 2, the interleaved conductive traces 52 extend in a direction orthogonal to the direction in which the interleaved conductor traces 32 extend from each being essentially in the same plane. In operation, the utilization circuits 44 and 60 and the switches 58 and 42, interact and coordinate in any appropriate well known manner to determine the spatial location beneath the template overlay 14 on the sensor pad regions 34, 34' and 34". The digitizer pad 12 featuring spatial minimization of the pressure contact area incorporated into this application by reference to the patent to Yaniger et al., Ser. No. 07/308,706, filed Feb. 9, 1989, provides a means for detecting edge locations along a first (X) dimension perpendicular to the direction in which the first and second conductor traces 32 and 52 are oriented on the base ply by stacking two digitizer plies 30 and 40 enabling the circuit traces to be substantially orthogonal to each other. The digitizer pad 12 can detect the edges of the contact area along two orthogonal dimensions, specifically the X and Y dimensions.

Incorporating for the shunt ply as shown in FIG. 1B, a force sensing resistor ply such as by way of example U.S. Pat. Nos. 4,315,238 and 4,739,299. The digitizer pad can detect the magnitude of the force pressing downward in the Z direction upon the digitizer pad through the template overlay 14. Also, the opposing edges of the pressure contact area in a second dimension orthogonal to the direction of the downward force F is identified. Finally, the location of the two edges of the contact area in a third dimension orthogonal to both the Z and X dimensions (for example, the Y direction) can be found.

For a single digitizer pad 12 an infinite variety of patterns of keys 7 and other functions may be defined within the active area of the template 14 over the pad 12. The mechanical layout of the template overlay 14 is no longer the constraining factor in the design and manufacture of a keyboard. As an example, a keyboard having a mechanical overlay of 64 square keys arranged rectilinearly can be restructured to a keyboard of 8 circular keys arranged in a triangular configuration with a change in the software and associated firmware such as the microprocessor code.

Figure 3A:
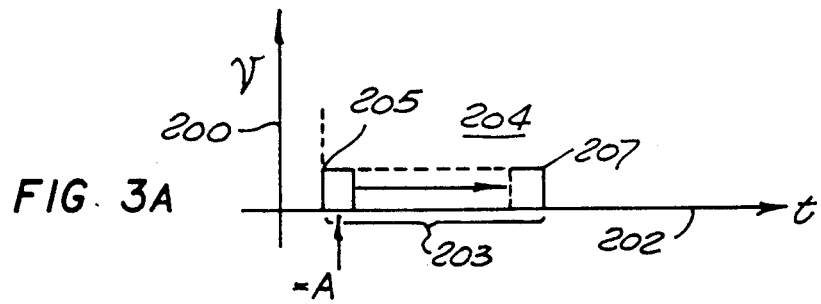
FIG. 3A is a graphical depiction of the output produced by the depression of a single key on the interchangeable template overlay.

FIG. 3A is a graphic depiction of the relationship of voltage 200 over time 202 of the output signal 204 produced by the depression of a single key as seen by the digitizer pad and processor having a defined leading edge 205 and trailing edge 207 depressed for a period of time 203. The voltage signal 204 is interpreted by the signal translator 26 as the key "A".

Figure 3B:
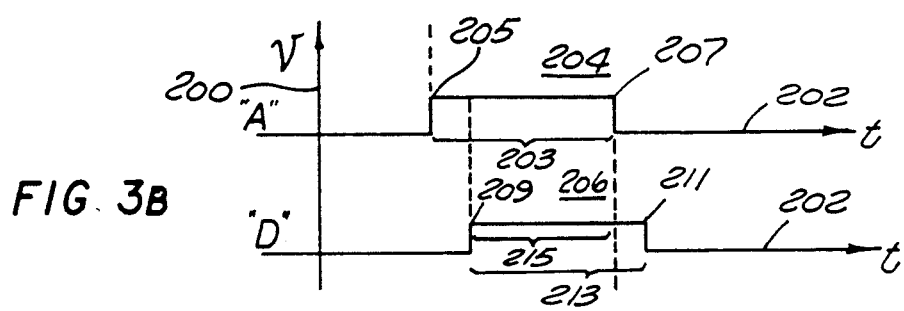
FIG. 3B is a graphical depiction of the output produced by the depression of two keys on the interchangeable template overlay simultaneously when the leading and trailing edge of the individual keys are too close to differentiate between them.

FIG. 3B is a graphic depiction of voltage 200 versus time 202 for the output signals 204, 206 generated by the depression of two keys on the template overlay simultaneously, where the leading and trailing edges of the individual keys are too close to differentiate between them.

In FIG. 3B, the "A" key, for example, produces a signal 204 having a leading edge 205 and trailing edge 207 when it is depressed for a period of time, the bracketed region 203. The "D" key produces a signal 206 having leading edge 209 and trailing edge 211 when it is depressed for a period of time, bracketed region 213. Then the "A" key and the "D" key are struck simultaneously, their signals 204 and 206, respectively, overlap, bracketed region 215. The "A" key and the "D" key produce different voltage levels when depressed. The size of the voltage signal will depend upon the positioning of the key pad on the digitizer pad.

Rollover occurs when two keys are struck simultaneously such as when one key is depressed and sends a signal to the processor before a previously depressed key has been released. In FIG. 3B we have an example of key rollover, wherein the "A" key is seen as depressed and then the "D" key is struck simultaneously, software can be programmed to recognize that the depression of a region on a keyboard or mechanical overlay as defined by a leading edge and trailing edge of the output signals 204, 206. The striking of the "A" key results in a leading edge which is relatively close to a trailing edge of a second key. The processor 24 as shown in FIG. 1A is programmed to sense a single keystroke, and when the distance between the trailing edge and the leading edge is below a predetermined threshold value. When the distance between the leading edge and the trailing edge of the two keys is greater than that predetermined threshold, the processor will automatically determine that two keys are simultaneously depressed and will ignore the bracketed region 215 during the simultaneous depression. When the "A" key is released, the leading edge 209 of the "D" key signal 206 in our example, immediately moves toward the trailing edge 211, narrowing the distance, causing a positive key depression signal to be interpreted for the "D" key. The rollover effect can be accounted for without ambiguous signal generation.

When a special control key is depressed while another standard keyboard key is also depressed such as, by example "control", "shift" or "alt" keys and a letter key, the processor must be reprogrammed to generate the appropriate control signal differentiating between them.

Figure 4:
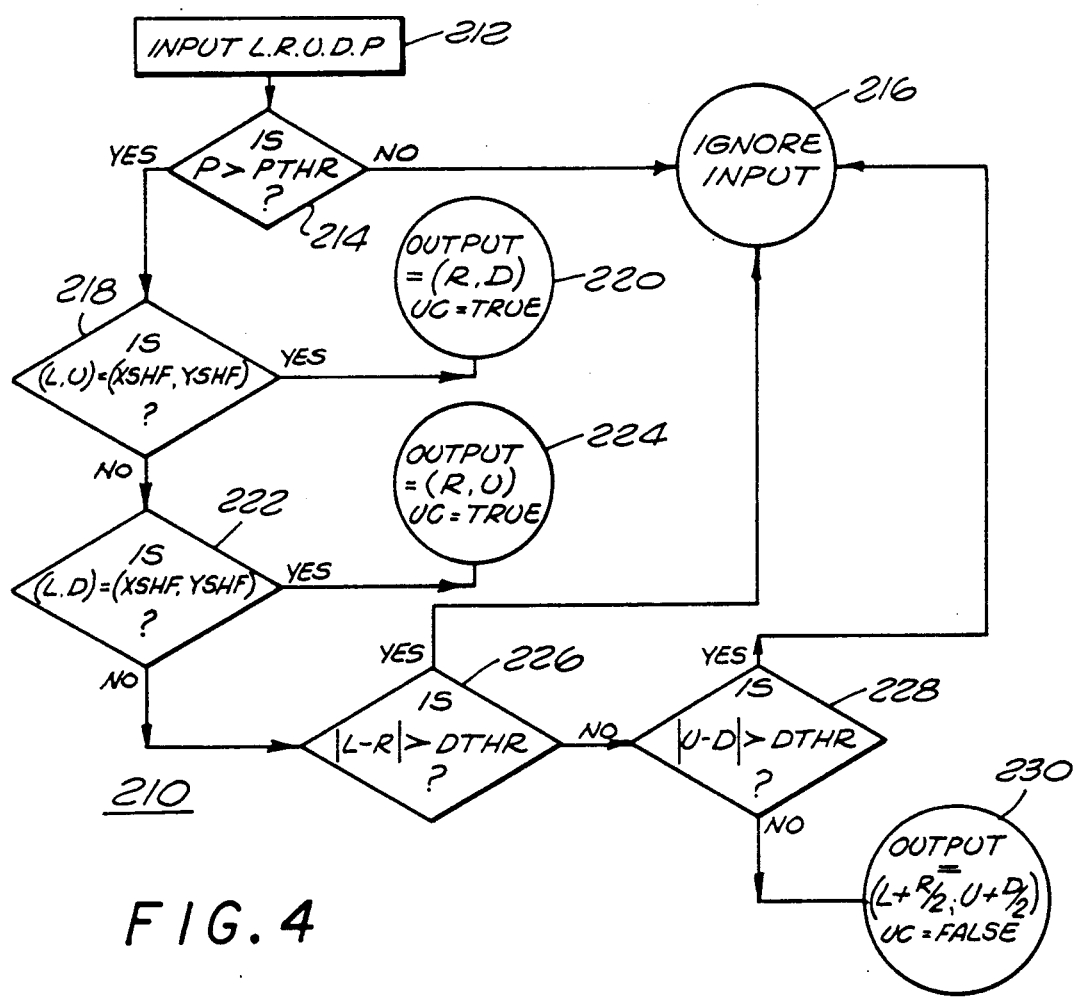
FIG. 4 is a flow chart of the mapping logic for the software program stored in the processor.

FIG. 4 is a flow chart of the recommended mapping logic for the software program stored in the processor 24 of FIG. 1A. This logic diagram 210 determines the leading and trailing edge of the depressed key upon the interchangeable template overlay.

FIG. 4 is one example of a logic algorithm 210 for the processing of data received from the digitizer pad 12, as shown in FIG. 1A. The voltage signals as shown in FIG. 3B are produced in response to the pressure applied to the individual keys of the keypad overlay on the digitizer pad.

In two specific instances two keys can be simultaneously depressed. First, a typist can depress the SHIFT KEY to capitalize a second depressed letter key. Second, a typist can type very quickly and simultaneously depress two letter keys, experiencing key rollover. The voltage signals generated by the simultaneous depression of two keys produce data which is analyzed in the processor by the logic algorithm 210. The logic algorithm 210 must determine from this data if the typist is capitalizing a letter key, or experiencing key rollover.

In FIG. 4 an input step 212 brings input data consisting of; L, the location of the depressed key's left-hand edge, R, the location of the depressed key's right-hand edge, U, the location of the depressed key's upper edge, D, the location of the depressed key's lower edge, and P the applied pressure to the depressed key into the logic algorithm 210. Constants programmed into the logic algorithm 210 include: XSHF, the X position of the SHIFT key on the keyboard, YSHF, the Y position of the SHIFT key on the keyboard, PTHR, the predetermined pressure threshold for detection of the key strike, DTHR, the predetermined distance threshold for detection of a multi-key strike. A variable for the algorithm 210 is UC, the upper case logical variable.

In a first comparison step 214, the algorithm determines if a key has been depressed. The detected, applied pressure, P is compared to the pressure threshold for detection of a key strike, PTHR. If the detected, applied pressure P, is greater than the pressure threshold, PTHR a second and a third comparison step is performed. If the detected, applied pressure P is less than the pressure threshold, PTHR then no key strike has been detected and the input data is ignored in a first output step 216.

The second and third comparison steps 218 and 222, respectively determine if the SHIFT key is being depressed. If the SHIFT key is in use then the data is interpreted as an upper case key strike, or capital letter. Specifically, in second comparison step 218 the position of the left-hand edge and upper edge of the key stroke is compared to XSHF, YSHF the constant X and Y position of the SHIFT key. If the second comparison step 218 determines that the SHIFT key is in use then a second output step 220 equates the right most edge and lower edge of the applied pressure as an upper case key strike. If the location of the left-hand edge, upper edge does not equal the X and Y position of the SHIFT key then a third comparison step 222 is performed.

The third comparison step 222 determines if the left-hand edge and lower edge is equivalent to the XSHF, YSHF the constant X position and Y position of the SHIFT key. If the third comparison step 222 determines that the SHIFT key is in use then the algorithm 210 produces a third output step 224 which equates the right-hand edge, and upper edge of the applied pressure as an upper case key strike. If the location of the right-hand edge, upper edge does not equal the X and Y position of the SHIFT key then a fourth comparison step is performed to determine if a multi-key strike has been detected.

The fourth and fifth comparison steps 226 and 228 respectively determine if key rollover has occurred. If the absolute value of the difference between the left-hand edge and the right-hand edge is greater than the predetermined distance threshold, DTHR then key rollover is detected. If the absolute value of the difference between the upper edge and the lower edge of the depressed keyboard area is greater than the predetermined distance threshold key rollover is detected.

Output step 230 examines the situation where key rollover has not been detected, and the SHIFT key has not been depressed. The average distance, $(L+R)/2$, between the left-hand and right-hand edges and the average distance, $(U+D)/2$, between the upper edge and the lower edge of the depressed area is not equal to the upper case logical variable, UC.

Of course, variations in the above illustrated embodiments are possible without departing from the present invention in its broadest aspects.

For example, the digitizer plies in FIG. 2 may be positioned at any angle relative to one another rather than at right angles. The example shown in FIG. 2 is a digitizer pad apparatus positioned beneath a rectangular interchangeable mechanical overlay. In this example, the two digitizer plies are stacked relative to one another. More than two digitizer plies may be stacked together and positioned at different relative angles to detect the edges of a contact area in other directions rather than just the orthogonal X—Y dimensions.

The multipurpose keyboard is operable to incorporate an endless variety of mechanical template overlays over the standard digitizer pad featuring spatial minimization of a pressure contact area. The incorporation of a different overlay will, of course, require the reprogramming of the processor and interchangeable EPROM.

In an additional embodiment of the multipurpose keyboard, the strike force of the keys can have a variable strike threshold. This variable strike threshold is achievable using a variable resistance within the digitizer pad such that the threshold at which the depression of a key will trigger a response in the processor is reduced or increased.

Accordingly, the following claims are intended to encompass all such modifications and alterations that fall within the true spirit and scope of the invention.

We claim:

1. A multipurpose keyboard, comprising:
an electronic pressure sensing means for simultaneously detecting the leading and trailing edges of at least one pressure contact area;
a programmable processing means for receiving location data for at least one spatial dimension from the electronic pressure sensing means and interpreting the location data;
a programmable controller means cooperatively associated with the processing means and for controlling the processing means;
at least one location data transmission means for each spatial dimension detected, transmitting location data from the electronic pressure sensing means to the processing means; and
an interchangeable active sensing element means cooperatively associated with the electronic pressure sensing means for depressing at least one pressure contact area.

2. The multipurpose keyboard of claim 1 wherein the electronic pressure sensing means is a digitizer pad featuring spatial minimization of the pressure contact area.

3. The multipurpose keyboard of claim 1 wherein the programmable processing means is further operable to determine the spatial dimension locations of the leading and trailing edge of the pressure contact area.

4. The multipurpose keyboard of claim 1 wherein the programmable controller means is an EPROM.

5. The multipurpose keyboard of claim 1 wherein the location data transmission means is a data bus.

6. The multipurpose keyboard of claim 1 wherein the interchangeable active sensing element means is a template overlay.

7. The multipurpose keyboard of claim 1 wherein the interchangeable active sensing element means is a mechanical key actuator.

8. The multipurpose keyboard of claim 1 wherein the electronic pressure sensing means further comprises at least two digitizer ply structures oriented orthogonal to one another in a plane, the digitizer ply structures further comprising, interleaved circuit traces of variable resistances.

9. The multipurpose keyboard of claim 1 wherein the programmable processing means is further operable to be programmed to alter the value of the activation pressure necessary to trigger the detector of a struck key.

10. A method of providing a multipurpose keyboard, the method comprising the steps of:
providing an electronic pressure sensing means for simultaneously detecting the leading and trailing edges of at least one pressure contact area;
providing a programmable processing means for receiving location data for at least one spatial dimension from the electronic pressure sensing means and interpreting the location data;
providing a programmable controller means cooperatively associated with the processing means for controlling the processing means;
providing at least one location data transmission means for each spatial dimension detected, for transmitting location data from the electronic pressure sensing means to the processing means; and
providing an interchangeable active sensing element means cooperatively associated with the electronic pressure sensing means for depressing at least one pressure contact area.

11. A multipurpose keyboard, comprising:
a digitizer pad operable to simultaneously detect the leading and trailing edges of at least one pressure contact area;
a programmable processor operable to receive location data for at least one spatial dimension from the digitizer pad, the processor further operable to interpret the location data and associate the location data with a predetermined known position;
a programmable controller cooperatively associated with the processor and operable to control the processor;
at least one location data transmission bus for each spatial dimension, operable to transmit location data from the digitizer pad to the processor; and
an interchangeable mechanical actuator cooperatively associated with the digitizer pad and operable to be depressed in at least one pressure contact area.

12. The multipurpose keyboard of claim 11 wherein the interchangeable mechanical actuator is a printed template overlay.

13. The multipurpose keyboard of claim 11 wherein the interchangeable mechanical actuators are mechanical keys.

14. The multipurpose keyboard of claim 11 wherein the digitizer pad further comprises at least two digitizer ply structures having interleaved circuit traces wherein each ply structure is positioned in a predefined orientation relative to the other ply structures.

15. The multipurpose keyboard of claim 11 wherein the programmable controller is an EPROM.

16. The multipurpose keyboard of claim 11 wherein the processor is a microprocessor.

17. The multipurpose keyboard of claim 11 wherein the programmable processor is operable to be programmed to vary the threshold at which the pressure contact area will trigger a response in the programmable processor indicating that an area of the interchangeable mechanical actuator has been depressed.

18. A method of providing a multipurpose keyboard, the method comprising the steps of:

providing a digitizer pad operable to simultaneously detect the leading and trailing edges of at least one pressure contact area;

providing a programmable processor operable to receive location data for at least one spatial dimension from the digitizer pad, the processor further operable to interpret the location data and associate the location data with a predetermined known position;

providing a programmable controller cooperatively associated with the processor and operable to control the processor;

providing at least one location data transmission bus for each spatial dimension, operable to transmit location data from the digitizer pad to the processor; and providing an interchangeable mechanical actuator cooperatively associated with the digitizer pad and operable to be depressed in at least one pressure contact area.

* * * * *